US007896196B2

(12) United States Patent
Wegelin et al.

(10) Patent No.: US 7,896,196 B2
(45) Date of Patent: Mar. 1, 2011

(54) FLUID DISPENSER HAVING INFRARED USER SENSOR

(75) Inventors: Jackson W. Wegelin, Stow, OH (US); Chip W. Curtis, West Dundee, IL (US)

(73) Assignee: Joseph S. Kanfer, Richfield, OH (US)

( * ) Notice: Subject to any disclaimer, the term of this patent is extended or adjusted under 35 U.S.C. 154(b) by 864 days.

(21) Appl. No.: 11/823,248

(22) Filed: Jun. 27, 2007

(65) Prior Publication Data
US 2009/0000023 A1 Jan. 1, 2009

(51) Int. Cl.
*F16K 51/00* (2006.01)
(52) U.S. Cl. .................................. 222/52; 251/129.04
(58) Field of Classification Search ............ 251/129.04; 250/210, 214 R; 222/52; 4/623
See application file for complete search history.

(56) References Cited

U.S. PATENT DOCUMENTS

| | | | | |
|---|---|---|---|---|
| 3,273,752 | A * | 9/1966 | Horeczky | 222/52 |
| 4,786,005 | A | 11/1988 | Hoffman et al. | 242/55.53 |
| 4,921,150 | A | 5/1990 | Lagergren et al. | 222/639 |
| 5,008,531 | A * | 4/1991 | Ono et al. | 250/222.1 |
| 5,008,532 | A * | 4/1991 | Ono et al. | 250/222.1 |
| 5,225,669 | A * | 7/1993 | Hasch et al. | 250/214 AL |
| 5,307,196 | A * | 4/1994 | Kinoshita | 398/202 |
| 5,336,882 | A | 8/1994 | Fooks et al. | 250/221 |
| 5,347,120 | A * | 9/1994 | Decker et al. | 250/214 B |
| 5,496,996 | A | 3/1996 | Barnes et al. | 250/223 |
| 5,551,598 | A * | 9/1996 | Cutsinger | 222/52 |
| 5,684,294 | A * | 11/1997 | Kouhi | 250/214 AL |
| 5,772,291 | A | 6/1998 | Byrd et al. | 312/34.22 |
| 6,105,898 | A | 8/2000 | Byrd et al. | 242/564.1 |
| 6,293,486 | B1 | 9/2001 | Byrd et al. | 242/564.1 |
| 6,390,329 | B1 | 5/2002 | Maddox | 222/25 |
| 6,433,329 | B1 | 8/2002 | Butka et al. | 250/221 |
| 6,455,839 | B1 * | 9/2002 | O'Connor et al. | 250/221 |
| 6,812,466 | B2 * | 11/2004 | O'Connor et al. | 250/341.1 |
| 6,854,684 | B2 | 2/2005 | Byrd et al. | 242/563 |

(Continued)

FOREIGN PATENT DOCUMENTS

EP 0 468 062 A1 1/1992

OTHER PUBLICATIONS

European Search Report issued Oct. 25, 2010 in corresponding European application No. 08252135.2.

*Primary Examiner*—John Bastianelli
(74) *Attorney, Agent, or Firm*—Renner Kenner Greive Bobak Taylor & Weber

(57) ABSTRACT

A dispensing system is disclosed which utilizes a controller in conjunction with a photodetector in order to provide automatic dispensing to a user when an object enters a target area. A controller is programmed to pulse a light source that is mounted proximate the photodetector. The controller constantly monitors the voltage at the receiving signal of the photodetector, and evaluates the difference in voltage from the light pulsed on and off. The controller sums the differences, and constantly updates the differences over a designated period to create an average difference value. The average difference value is summed with a target offset value and compared to a momentary voltage difference. When the momentary difference exceeds the sum of the target offset value and average difference, the controller sends a signal to a dispense mechanism which dispenses a fluid or other product on the object.

25 Claims, 5 Drawing Sheets

U.S. PATENT DOCUMENTS

| | | |
|---|---|---|
| 6,903,654 B2 | 6/2005 | Hansen et al. .............. 340/562 |
| 6,903,660 B2 | 6/2005 | Clark et al. .............. 340/854.8 |
| 2006/0006354 A1* | 1/2006 | Guler et al. ............ 251/129.04 |
| 2006/0163416 A1 | 7/2006 | Byrd et al. .................. 242/563 |
| 2006/0175341 A1 | 8/2006 | Rodrian ....................... 221/13 |
| 2006/0289819 A1* | 12/2006 | Parsons et al. ......... 251/129.04 |

* cited by examiner

FLUID DISPENSER HAVING INFRARED USER SENSOR

TECHNICAL FIELD

The invention relates to fluid dispensers and methods for dispensing fluid. More particularly, the invention relates to electric "hands-free" fluid dispensers and methods for dispensing liquid fluid when an object enters a target field.

BACKGROUND OF THE INVENTION

Automatic dispensing devices that deliver liquids, towels, or other materials are known in the prior art. It is also well known that devices for automatically delivering fluid or the like onto the hands of a user, without requiring manual operation thereof or any physical contact therewith, are known in the prior art. It is well known in the art that such a dispenser may employ an electronic control circuit that monitors a voltage generated by a photo sensor to detect the presence of a user. Early hands-free devices employed a light-emitting diode (LED) in communication with a photodiode. When a user was within the target, the photodiode voltage changed and a signal was sent to supply power to a dispenser motor. However, dispensers that employ this technology fail to compensate for changes in ambient lighting conditions. In addition, these dispensers present power requirement concerns, because detection circuitry requires constant power.

A known hands-free dispenser is shown in U.S. Pat. No. 5,772,291 to Byrd et al. The "hands-free" device in the Byrd patent includes both an array of photovoltaic cells and a photo sensor that detects the amount of light present in the room. The array of photovoltaic cells supplies a reference voltage to the negative input, and the photo sensor supplies a "detection" voltage to the positive input. This allows the dispenser's motor to activate when the photo sensor's voltage becomes greater than the ambient light's reference voltage. Since the array of photovoltaic cells provides power to the control circuitry, the dispenser will only function if there is light present in the room. The device in the Byrd et al. patent requires two separate detection devices that require additional hardware.

Also well known in the art are dispensers that measure capacitance as a means of detection. Conductors are arranged on the unit to provide a capacitance value.

One such device is shown in U.S. Pat. No. 6,903,660 to Hansen et al. This "hands-free" device comprises a differential frequency discriminator used in a signal detection circuit, first and second averaging circuits, and a comparator. When the change in average capacitance is greater than what is allowed by set parameters, the motor is powered and a fluid dispensed.

Another common "hands-free" dispenser known within the art employs pulsed signals similar to what is applied in a television set. One such dispenser is found in U.S. Pat. No. 4,786,005 to Hoffman et al. This dispenser contains circuitry, wherein a phototransistor constantly senses the level of ambient light. When the phototransistor senses a drop in ambient light level, the input of the integrated circuit from the phototransistor goes low. The voltage from the phototransistor is modulated and channeled through a transistor to power an LED at a pulsed infrared light, which is distinct from any stray infrared light which may be received by an infrared sensor receiver. The dispenser utilizes a different phototransistor to sense the pulsed light signal, and then communicates to the circuitry that powers the dispenser motor. The detection of stray infrared light can cause unwanted dispensing events.

In light of the foregoing, it is desirable to provide an improved electronic control system for use in an automatic fluid dispenser of the type generally described above that exhibits low average power drain yet provides significant immunity to background noise.

SUMMARY OF THE INVENTION

It will be appreciated from the foregoing that there is a primary need for a low-cost hands-free dispensing system that operates at low power consumption and accounts for changes in lighting conditions.

Accordingly, it is one aspect of the present invention to provide an improved electronic control circuit for use in controlling an automatic fluid dispenser.

It is another aspect of the present invention to employ a controller to interpret voltages supplied by a photodiode to control the hands-free operation of a dispensing unit.

It is a further aspect of the present invention to prevent continuous dispensing if the user or object remains in a target area.

It is yet another aspect of the present invention to constantly adapt to ambient light conditions for setting parameters for functioning of the dispenser.

It is still another aspect of the present invention to monitor an average difference of light conditions of recent room conditions and compare momentary differences of light conditions for detecting an object.

It is a further aspect of the present invention to dispense fluid when a sudden change in the difference in light conditions exceeds the sum of an average difference in light conditions and an offset value.

The exemplary system disclosed herein fills these needs by facilitating a hands-free dispensing device that operates at low power consumption. The dispensing device utilizes an infrared light emitting diode (IR LED), a photodiode, and a controller that accounts for the presence of a user, and communicates the signal received to a dispense mechanism to provide fluid to a user. This dispensing device can be permanently affixed to the dispenser or can be incorporated within a replacement cartridge carried by the dispenser. This invention generally relates to the field of fluid dispensers, and it should be known that the following hands-free control circuitry could be easily adapted to apparatuses that dispense paper towels or other materials. One embodiment will be described as a soap dispenser, but it should be readily apparent that the present invention may also be applied to a variety of dispensers, which may dispense other fluids or paper products.

Still another aspect of the present invention is to provide a hands-free dispenser for dispensing a product into a target area, comprising a dispensing mechanism, a light emitting diode associated with the dispensing mechanism, a controller, and a photodetector associated with the light emitting diode that detects light levels of a target area and which generates a voltage received by the controller that corresponds to detected light levels, wherein the controller compares a Momentary Difference Value in the voltage to an Average Difference value in the voltage plus a Target Offset value, the controller sending a signal to the dispensing mechanism when the Momentary Difference value is greater than the Average Difference Value plus the Target Offset value.

Yet another aspect of the present invention is to provide a method for dispensing product, comprising pulsing a light source proximate to a photodetector, reading and storing an Active Voltage value from the photodetector when the light source is illuminated, reading and storing an Ambient Voltage value from the photodetector when the light source is not illuminated, calculating a Momentary Difference between the Active Voltage value and the Ambient Voltage value, comparing the Momentary Difference to a sum of an Average Difference and a Target Offset, wherein the Average Difference is calculated from prior Momentary Difference values of the photodetector over a time interval, generating a signal to dispense when the Momentary Difference is greater than the sum, and dispensing the product when the signal to dispense is received by a dispensing mechanism.

These and other aspects of the present invention, as well as the advantages thereof over the existing prior art forms, which will become readily apparent from the description to follow, are accomplished by the implementation of the present invention.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
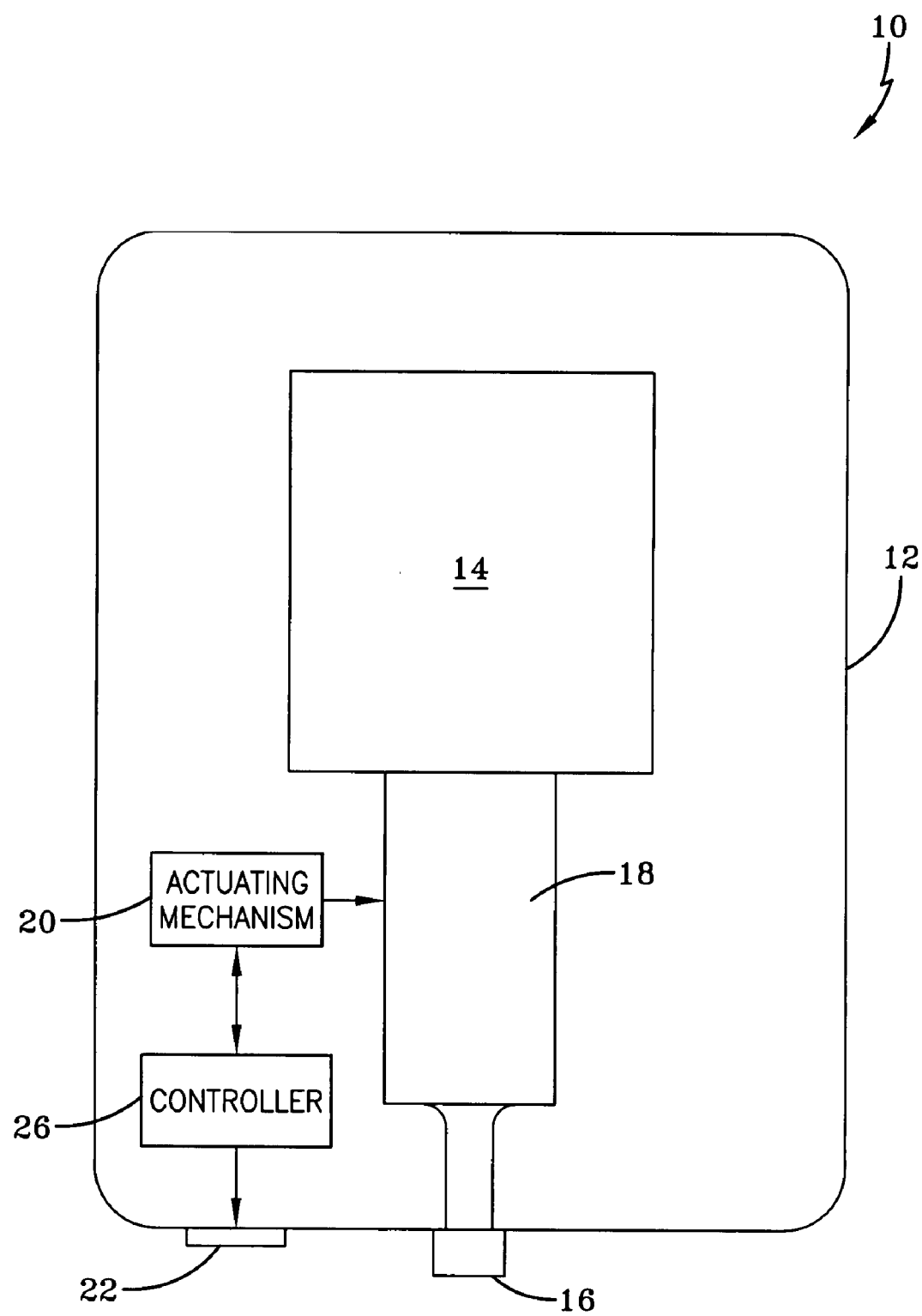
FIG. 1 is a schematic of a hands-free dispenser made in accordance with the concepts of the present invention.

Referring now to the drawings and more particularly FIG. 1, it can be seen that a dispenser made in accordance with the invention is designated generally by the numeral 10. The dispenser 10 includes a dispenser housing structure of widely known dispensers, designated generally by the numeral 12. The dispenser housing 12 may be a wall or counter-mount unit, or can be a freestanding unit disposed on a counter top or the like. The dispenser described herein is used for dispensing fluids such as soaps and other liquids, but it will be appreciated that other products could be dispensed such as paper, tablets, or any flowable material. In any event, the dispenser housing 12 typically includes a cartridge of liquid product 14 positioned above and in communication with a dispensing nozzle 16, with an appropriate pump or other dispensing mechanism 18 interposed therebetween. As is well known by those skilled in the art, the dispensing mechanism 18 is configured to dispense a preset amount of liquid upon each dispensing cycle. In accordance with the invention, the dispensing mechanism 18 is controlled by an actuating mechanism 20 such as a motor, solenoid, plunger or the like. The mechanism 20 is energized upon the detection of an object, such as a user's hands, positioned beneath the dispensing nozzle 16.

Figure 2:
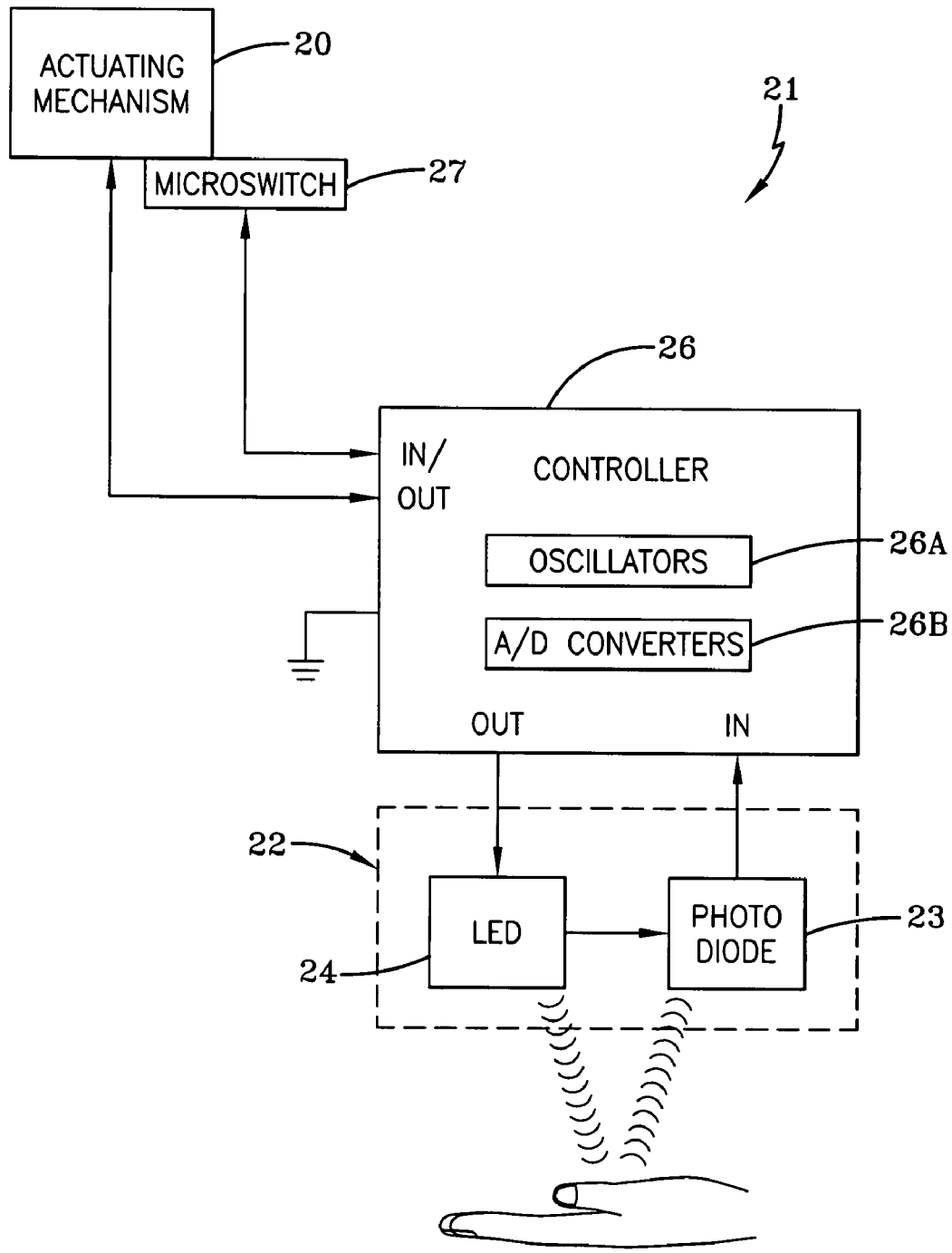
FIG. 2 is a detailed schematic of the dispenser showing a controller, an infrared LED, and photodiode according to the present invention.

Referring now to FIG. 2, it can be seen that a control circuit, designated generally by the numeral 21, is connected to the actuating mechanism 20. The control circuit 21 includes an appropriate photodetector 22, which is positioned in association and/or proximity with the nozzle 16, and which detects the presence of hands or other target-area object by means of an appropriate reflective signal or the like. In that regard, the detector 22 may, indeed, be a transducer, both sending and receiving signals. The invention presented and described in detail below is an improvement and refinement of the dispenser 10.

In the present embodiment, the photodetector 22 comprises a photodiode 23 that detects ambient light and light of infrared light emitting diode (IR LED) 24. Briefly, the photodiode 23 detects a broad range of light wavelengths within a predetermined distance therefrom. For proper operation of the dispenser, the photodiode 23 is utilized to establish an ambient light value. The skilled artisan will appreciate that the ambient light value varies based upon whether the dispenser is maintained in a room with windows and the amount of daylight in the room, the type of artificial lighting in the room, and the level of reflectivity of surfaces in proximity to the dispenser. As will be discussed in greater detail, the photodiode 23 also detects light reflected from an object that is positioned in relatively close proximity thereto and which is usually attributable to light generated by LED 24. As such, infrared light reflected by any object that is detectable by the photodiode 23 causes enablement of the actuating mechanism 20, which results in dispensing of a predetermined amount of material. The control circuit 21 further includes a controller 26, which receives data or an appropriate signal from the photodiode 23. In operation, the device is normally in a stand-by condition, waiting for detection of an object by the photodiode 23. In some embodiments, the photodetector may also be a phototransistor, etc.

Figure 3:
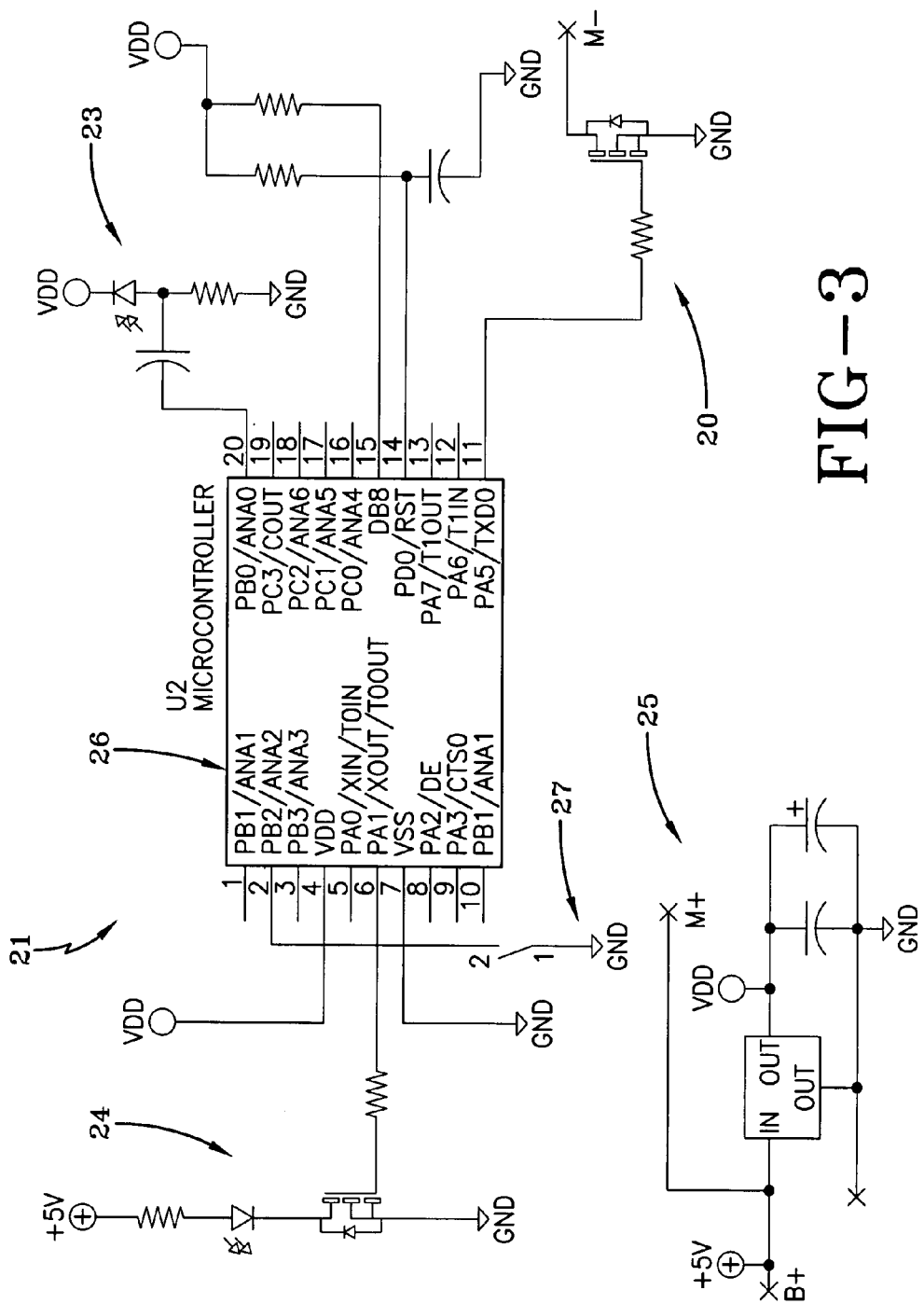
FIG. 3 is a circuit diagram of a control circuit used by the dispenser in accordance with the concepts of the present invention.

In FIGS. 2-3, it can be seen that the IR LED 24 is controlled by controller 26 in order to produce short pulses at a significantly higher current compared to the prior art. For example, the IR LED 24 may pulse for a period less than 150 microseconds and operate between 100 mA to 1.5 A. In other embodiments, the IR LED 24 may pulse for a period of about 10 microseconds and operate between 0.5 A and 1 A. The IR LED 24 is mounted proximate to photodiode 23. Controller 26 monitors the amount of voltage at photodiode 23. Photodiode 23 can be positioned anywhere on dispenser 10 or separately mounted as long as photodiode 23 can detect reflected light emitted from the IR LED 24. Controller 26, somewhat contemporaneously, generates a signal to energize the IR LED 24 and reads the voltages produced by the photodiode 23. These voltage values—referred to as active—are then compared to voltage values most recently read and classified as being representative of the ambient light values. These values are then processed by the controller in a manner that will be described.

An outside power source 25 is supplied to photodiode 23 apart from the controller 26. Accordingly, a photodiode amplifier may be incorporated within dispenser 10 to provide an amplified signal required for controller 26 to detect the amount of light of the environment surrounding dispenser 10. Photodiode amplification can be achieved in a variety of different means. In one embodiment, reverse biased circuitry is used to achieve sufficient amplification.

Controller 26 provides the necessary hardware, software and memory to implement the functions of the control circuit and properly operate the dispenser 10. The controller 20 could be a microcontroller such as manufactured by Zilog. Of course controllers manufactured by others could be used. The controller 26 may also include, among other components, multiple oscillators 26A and an analog to digital converter 26B. Generally, one of the multiple oscillators 26A could be an internal oscillator, which, if properly enabled, may run continuously. Other oscillators may be used for other functions. Skilled artisans will appreciate that the controller 26 includes a watchdog timer that is associated with the internal oscillator so that the controller may be stopped or halted for a predetermined period of time. Accordingly, full operation of the controller only occurs at predetermined increments so as to reduce current draw from a power supply. This conserves power and helps to increase the life of the power supply which may be in the form of a battery. The converter 26B is utilized by the controller to receive analog voltage signals generated by the photodiode 23 and converts the signals to digital values so as to enable further processing and operation of the dispenser. The converter 26B may be in the form of a comparator or a Successive Approximation Register Analog to Digital Converter.

The controller 26 generates and sends a signal to the actuating mechanism 20 when an object is detected within the target field. Program instructions maintained by the controller 26 utilize the following variables which will be defined for the purposes of the present invention: Active Voltage, Ambient Voltage, Momentary Difference, Average Difference, Target Level Offset, and End of Dispense signal. Active Voltage refers to the voltage value controller 26 monitors and records from photodiode 23 when the IR LED 24 is on. Ambient Voltage refers to the voltage value controller 26 monitors and records from photodiode 23 when the IR LED 24 is off. Momentary Difference is calculated by controller 26 and is equal to the difference between Ambient Voltage and Active Voltage. The controller's programming logic discards Momentary Difference values that are negative. This is done so that the controller disregards values that are commonly generated with a sudden change in a room's light conditions. Average Difference is a calculated value that is based on a series of Active Voltage minus Ambient Voltage differences. An initial Average Difference value is set at a large arbitrary value at programming of the controller. In the present embodiment, the initial value for average difference is 0.7 volts. Of course, other voltage values could be used as appropriate. Subsequent Average Difference values are equal to the average of Active Voltage minus Ambient Voltage recorded over an averaging cycle. The averaging cycle can be any number of readings taken over a period of time. In one embodiment, the averaging cycle consists of four readings per second for eight seconds (32 readings). The Average Difference ignores negative values and measured values when an object is detected as well as any negative voltage value readings.

In order to initiate a dispensing cycle, the controller 26 requires the Momentary Difference to exceed the Average Difference plus a Target Level Offset. The Target Level offset variable acts as a threshold so that controller 26 only generates a signal to activate actuating mechanism 20 when an object is in detection range of photodiode 23. A fixed Target Level Offset of 50 mv is an exemplary value. Target Level Offset may also be calculated based on a percentage compared to voltage levels provided by photodiode 23 or a combination of a fixed value in accordance with a calculated average value based on past experience. An End of Dispense signal is the output produced by a microswitch 27 or the like, that indicates the end of one dispense cycle. In one embodiment, the microswitch 27 is associated with the actuating mechanism 20. For example, the microswitch could be positioned on the gears of a pump, such that the microswitch 27 is activated at one complete revolution of a pump camshaft. Receipt of the End of Dispense Signal 27 will cause the controller to stop the actuating mechanism 20.

Controller 26 compares Momentary Difference to Average Difference plus Target Level Offset for determining whether to send a signal to the actuating mechanism. Controller 26 outputs a signal to the actuating mechanism 20 when the Momentary Difference value exceeds the sum of the Average Difference plus the Target Level Offset. Controller only searches for a target about every 0.25 seconds, or other predetermined period of time. When not searching for the target, the controller is only running minimal functions so as to consume only the minimum amount of power required to maintain operation thereof. The controller 26 includes this low duty cycle in order to maintain low power consumption. The rate at which the unit dispenses directly relates to the speed at which the variables of the logic are obtained and the speed at which controller 26 processes information. In one embodiment controller 26 operates at about 5.5 MHz while searching for a target.

Figure 4A:
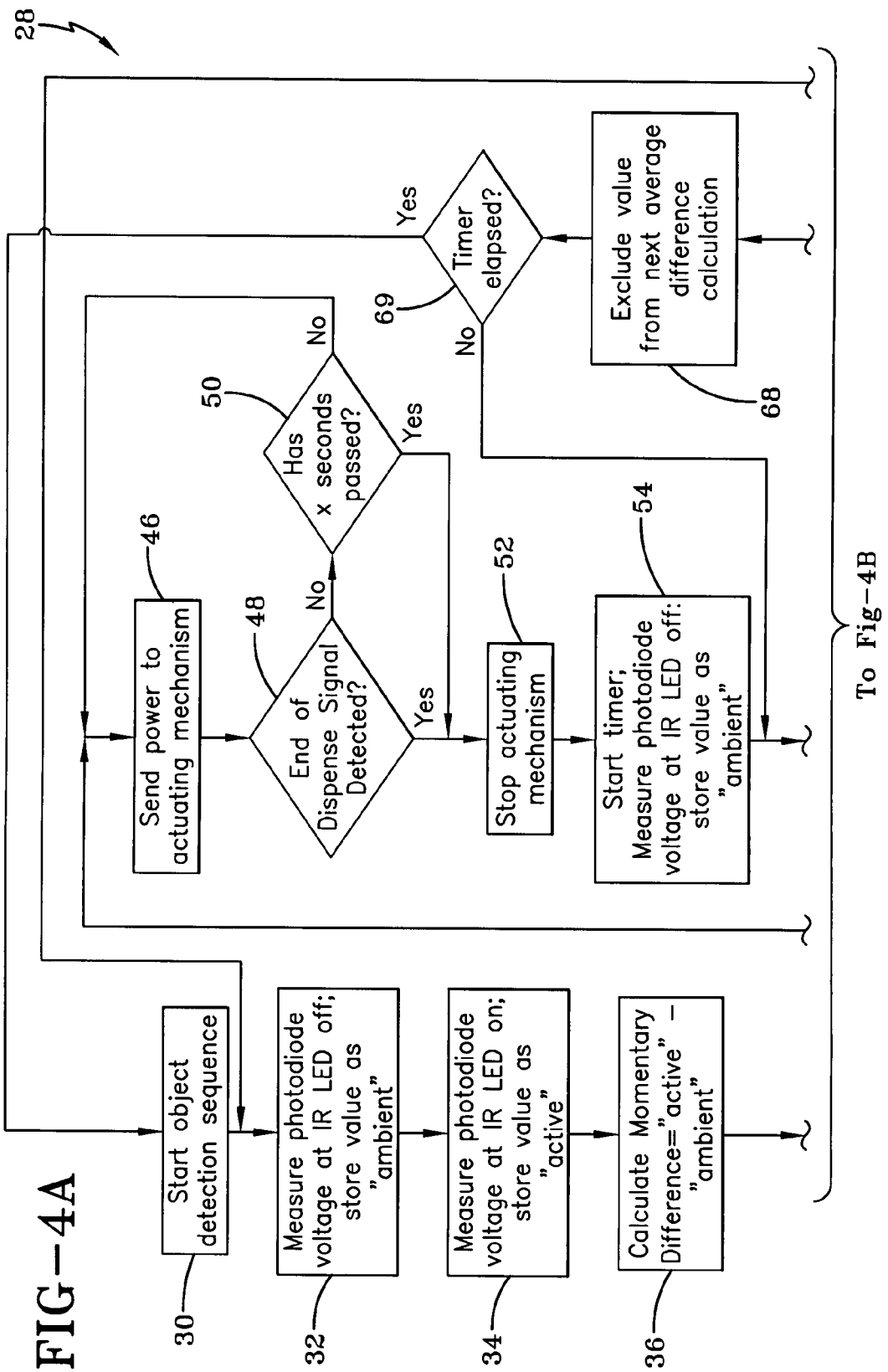
FIGS. 4A and 4B show a flowchart of the operational steps for dispensing product.
Figure 4B:
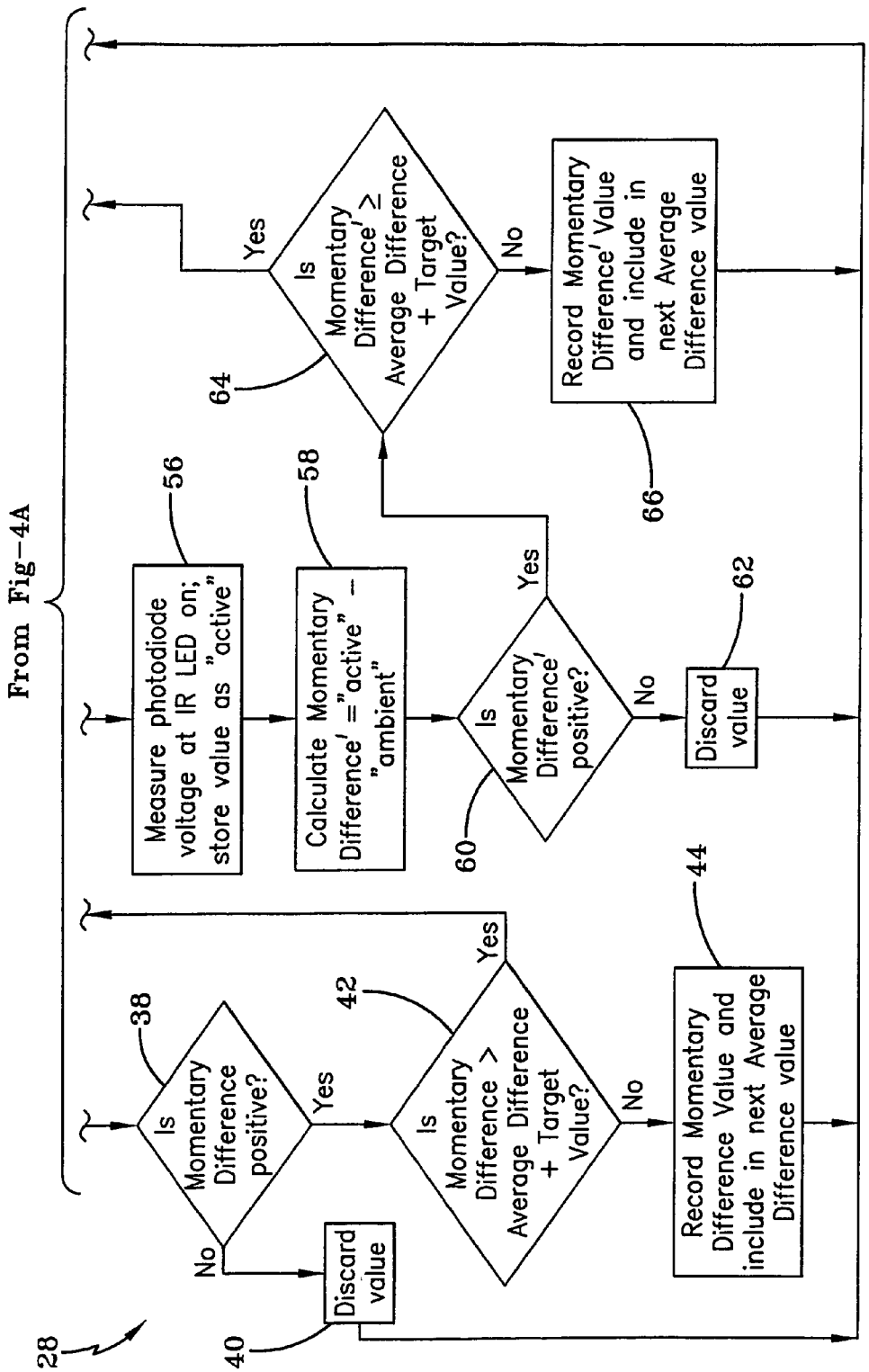

The operational process performed by the controller for object detection is designated by the numeral 28 as shown in FIGS. 4A and 4B of the drawings. Object detection 28 has a start sequence at step 30. At step 32, controller 26 measures the voltage of photodiode 23 when the IR LED 24 is off, and stores that value as "ambient." At step 34, controller 26 then measures the voltage of photodiode 23 when the IR LED 24 is on, and stores that value as "active." Controller 26 assumes that no object is within target range when measuring the values for steps 32 and 34. Controller 26 then calculates the Momentary Difference by calculating the difference between "active" and "ambient" values as shown at step 36. A determination is then made as to whether the Momentary Difference is positive as shown at decision block 38. When the Momentary Difference is determined to be negative as shown at step 40, the value is discarded and logic initiates a new sequence by returning to step 32. When the Momentary Difference is positive as shown in block 42, the logic compares the Momentary Difference to the sum of the Average Difference and a Target Value Offset. When the Momentary Difference is less than the sum as represented at step 44, the value is added to the Average Difference value and the logic initiates a new sequence starting back at step 32.

When the Momentary Difference is greater than the sum as shown at step 46, controller 26 sends a signal to the actuating mechanism. As shown in step 48, the controller awaits the End of Dispense Signal 27 to determine whether the dispense mechanism is currently in operation. If the End of Dispense signal 27 is detected at step 48, the controller stops them motor as shown in block 52. If the End of Dispense signal 27 is not detected at step 48, the controller determines whether a predetermined period of time such as three seconds has passed since the start of the dispense cycle as shown at step 50. If the elapsed time is less than the predetermined period of time, the logic returns to block 46. However, if the elapsed time is greater than the predetermined period of time, the actuating mechanism stops the dispense cycle as shown at step 52. The amount of the maximum run time can be any value.

The controller calculates another Momentary Difference value designated as Momentary Difference' as shown in steps 54, 56, and 58. The Momentary Difference', shown in step 58, is somewhat similar to the Momentary Difference calculation represented in steps 32-36. It is noted that at step 54 a timer is started for some time period, such as ten seconds. This timer is utilized to ensure that the object previously detected is moved. As such, the following steps prevent the dispenser for continually dispensing material in the event someone places an object in the range of the LED, but does not remove the object. In any event, a determination is then made as to whether the Momentary Difference' is positive as shown in step 60. When the Momentary Difference' is negative, then at step 62 the value is discarded and the controller's logic initiates a new sequence starting back at step 32. However, when the Momentary Difference' is positive, then at step 64 the logic compares the Momentary Difference' to the sum of the Average Difference plus a Target Value Offset. When the Momentary Difference' is less than the sum calculated at step 64, the calculated Momentary Difference' value is incorporated into the Average Difference value at step 66 and the logic initiates a new sequence starting back at step 32.

When the Momentary Difference' value is greater than or equal to the calculated sum at step 64, controller 26, at step 68, then excludes the Momentary Difference' value from the next Average Difference calculation. This is done so that the Average Difference Value is not distorted. At step 69 a determination is made as to whether the timer started at step 54 has elapsed or not. If the timer has not elapsed, the process proceeds to step 56. If the timer has elapsed, then the process returns to step 30. By using the timer, if a certain time is met and the target has not left, the controller will recalibrate to re-set the Average Difference value. Controller 26 may include means to convert an analog signal to digital at a rate under 20 microseconds which can be achieved though use of the converter 26B.

As noted previously, controller 26 is halted or stopped when it is not searching for a target and operates between 1 MHz and 20 MHz when it is searching for a target. In one embodiment, controller 26 utilizes an internal oscillator which operates at about 5.5 MHz when searching for a target. The controller 26 may also utilize a low frequency oscillator while the controller is halted or stopped so that the other oscillators and other controller functions are re-awakened at the appropriate time. The low frequency oscillator may operate between 5 kHz and 200 kHz. In one embodiment, the low frequency internal oscillator operates at about 10 kHz.

Although the embodiments described suggest values of operation, it should be appreciated that one skilled in the art could readily apply comparable values while staying within the spirit of this invention.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A hands-free dispenser for dispensing a product into a target area, comprising:
    a dispensing mechanism;
    a light emitting diode associated with said dispensing mechanism;
    a controller; and
    a photodetector positioned so as to detect reflected light from said light emitting diode that represents light levels of a target area and which generates a voltage received by said controller that corresponds to detected light levels,
    said controller programmed to:
    determine an Active Voltage value recorded from said photodetector when said light emitting diode is on;
    determine an Ambient Voltage value recorded from said photodetector when said light emitting diode is off;
    determine an Average Difference value based on a series of Active Voltage values minus Ambient Voltage values;
    determine a Momentary Difference value equal to the difference between an Ambient Voltage value and an Active Voltage value;
    set a Target Level Offset value, and
    send a signal to said dispensing mechanism when said Momentary Difference value exceeds said Average Difference value plus said Target Level Offset value so as to dispense the product into the target area.

2. The dispenser according to claim 1 wherein said photodetector comprises either a photodiode or a phototransistor.

3. The dispenser according to claim 1 wherein said light emitting diode is an infrared light emitting diode powered by said controller and said controller pulses said diode for less than 150 microseconds each time said controller searches for an object in the target area.

4. The dispenser according to claim 1 wherein said controller operates between 1 MHz and 20 MHz when searching for an object in the target area.

5. The dispenser according to claim 4 wherein said controller stops when not looking for the object in the target area.

6. The dispenser according to claim 4 wherein said controller maintains an oscillator which continues to run when said controller is not searching for the object.

7. The dispenser according to claim 4 wherein said voltage is measured using a successive approximation register analog to digital converter.

8. The dispenser according to claim 4 wherein said voltage is measured using a comparator.

9. The dispenser according to claim 1 wherein said infrared light emitting diode is an infrared light emitting diode that operates between 200 mA to 1.5 A when pulsed by said controller.

10. The dispenser according to claim 1 wherein said controller calculates a Difference Value from an Active Voltage Value generated when said light emitting diode is on, and an Ambient Voltage value generated when said light emitting diode is off, wherein said Average Difference value is calculated by averaging a number of Difference Values per second over a predetermined period of time.

11. The dispenser according to claim 1 wherein said Difference Values that are negative are omitted from said Average Difference calculation.

12. The dispenser according to claim 1 wherein said Momentary Difference value is included in said Average Difference Value when said Momentary Difference value is less than a sum of said Average Difference and said Target Offset.

13. The dispenser according to claim 1 wherein said Average Difference value is updated whenever a Momentary Difference value is taken.

14. The dispenser according to claim 1, wherein said Target Offset value is a fixed value.

15. The dispenser of claim 1 wherein said Target Offset value is calculated by said controller.

16. The dispenser according to claim 1, wherein said Target Offset value is based on a percentage of said Average Differences.

17. The dispenser according to claim 1 wherein the product is a liquid.

18. The dispenser according to claim 1 wherein the product is a skin-care product.

19. The dispenser according to claim 1 wherein the product is soap.

20. A method for dispensing product, comprising:
    pulsing a light emitting diode;
    positioning a photodetector proximate said light emitting diode so as to detect reflected light therefrom;
    reading and storing an Active Voltage value from said photodetector detecting reflected light when said light emitting diode is illuminated;

reading and storing an Ambient Voltage value from said photodetector detecting any light when said light emitting diode is not illuminated;

calculating a Momentary Difference between said Active Voltage value and said Ambient Voltage value;

calculating an Average Difference value based on a series of Active Voltage values minus Ambient Voltage values over a time interval;

comparing said Momentary Difference to a sum of an Average Difference and a predetermined Target Offset value;

generating a signal to dispense when said Momentary Difference is greater than said sum; and dispensing the product when said signal to dispense is received by a dispensing mechanism.

21. The method according to claim 20 wherein the product is liquid.

22. The method according to claim 20 wherein the product is a skin-care product.

23. The method according to claim 20 wherein the product is soap.

24. The method according to claim 20 wherein the product is paper.

25. The method according to claim 20 wherein said light emitting diode is an infrared light emitting diode that is pulsed for less than 150 microseconds.

* * * * *